Jan. 13, 1953 J. G. SPEER 2,625,349
AIRPLANE CONTROL SYSTEM
Filed Dec. 2, 1946 2 SHEETS—SHEET 2

Fig. 2.

INVENTOR.
Joseph G. Speer
BY
ATTORNEY

Patented Jan. 13, 1953

2,625,349

UNITED STATES PATENT OFFICE 2,625,349

AIRPLANE CONTROL SYSTEM

Joseph G. Speer, Merriam, Kans.

Application December 2, 1946, Serial No. 713,421

4 Claims. (Cl. 244—83)

This invention relates to airplanes and more particularly to a system of controls therefor, designed to simplify operation thereof, render flying safer than has heretofore been possible, and to prevent means whereby the pilot may maneuver the craft, particularly through turns, with ease and accuracy.

The primary object of this invention is to provide an airplane control system having means for linking together certain of the control surfaces and a common control stick in such manner as to afford the necessary coordination, with a resulting simplification of the controlling effort exerted by the pilot.

The most important object of this invention is to provide an airplane control system having means for operably connecting the rudder and the ailerons to a common control stick or wheel, which means includes a number of interconnected links and swingable yokes, and resilient members interposed therein for establishing coordinated displacement in the rudder and the ailerons to the extent necessary for executing a turn upon movement of the control stick in a given direction.

Another important object of this invention is the provision of a control system for airplanes having the aforesaid resilient members formed of relatively different resilient strengths and so proportioned that to execute a turn at a desired angle, the extent of displacement of the rudder and ailerons will increase or decrease proportionately upon movement of the control stick or wheel, as the speed of the airplane decreases or increases respectively to a predetermined point prior to and/or as the turn is being executed.

A further object of this invention is to provide a control system for airplanes having the above described relative differences in the resiliencies of said resilient members so proportioned as to increase and decrease the extent of displacement of the rudder and aileron control services as the slip stream of the airplane propeller decreases or increases respectively.

A still further object of this invention is to provide linkage having certain elastic or resilient mediums so proportioned as to hold the airplane in a turn with negligible lateral motion and at an angle of bank proportional to the extent of movement of the control stick or wheel after the turn has been established upon such movement of the control stick or wheel.

Another object of this invention is to provide an airplane control system having a number of springs interposed within a grouping of linkage, the disposition of such springs and the arrangement of said linkage being so designed as to produce a force proportional to the rate of movement of the control wheel, which is transmitted to the rudder and ailerons to produce accelerating yawing and banking forces respectively of such magnitude and proportions as to produce the change in angle of bank and radius of turn required to execute a turn.

This invention has for another important object the provision of so proportionately forming the aforesaid springs coupled with at least one retarding device in the form of a dashpot or other damping mechanism, to the end that the angle of bank and radius of turn of the airplane will change during the initial execution of a turn and while the control wheel or stick is being moved to a position in conformity with the new position to which the control wheel has been moved.

Another object of this invention is to provide through the aforesaid interconnecting linkage, resilient members, and damping device or devices, a control system for airplanes to produce rudder and ailerons accelerating forces coordinated as to amplitude to not only compensate for variations in airplane speed and propeller slip stream, but coordinated as to time of application and removal to compensate for the effect of moments of inertia inherently present when the attitude of the airplane is changed in establishing the turn.

A still further object of this invention is to provide an airplane control system wherein the various accelerating forces applied to establish a turn in the airplane are not only proportional to the rate of movement of the control wheel, but are independent of the extent of movement of such wheel and which forces vanish when the wheel is stopped in any given position.

An important object of this invention is to provide an airplane control system having means for directly connecting the control stick thereof to the ailerons and to provide a series of swingable yokes, interconnected linkage and springs for joining the rudder to said said control stick to the end that the accelerating forces applied to the rudder are coordinated as to amplitude to compensate for variations due to changes in speed and slip stream in the same manner as set forth above.

Another object of this invention is to provide a control system having the above described direct connection between the control stick and ailerons and the spring loaded linkage and retarding device connecting the stick to the rudder for producing relative banking, and yawing forces will produce minimum lateral acceleration in the airplane, resulting in the ultimate lateral motion that will maintain a steady turn upon return of the control stick to the point of beginning or neutral position, wherever the steady turn position may be found.

Still a further object of this invention is to provide a control system for airplanes having a damping or cushioning device, interposed within the structure forming the above mentioned interconnected linkage and elastic members which damping device applies retardation to the rudder, or to the elastic members, through change the rudder of the airplane is displaced, so that the rudder displacement is retarded at a particular time and by an amount which will retard the yawing accelerations to the same extent that the rolling accelerations of the airplane about its longitudinal axis is retarded by the moment of inertia of the airplane about such axis.

A still further object of this invention is to provide means to maintain straight and laterally level flight in the airplane when the above described system is used through the medium of angular displacement of the propeller thrust, to produce a pawing force which will compensate for yawing in an opposite direction through use of such system.

Many minor objects will be made clear or become apparent throughout the course of the following specification, referring to the accompanying drawings, wherein:

It is well understood by those skilled in the art that conventional airplanes usually are equipped with three independent control surfaces and a control stick or wheel which is manually manipulable by the pilot to control the motion of the airplane about its three axes of rotation. These auxiliary surfaces consist of ailerons, an elevator and a rudder, the former being movable upon rotation of the control wheel or lateral motion of the control stick to roll the craft on its longitudinal axis. Fore and aft motion of the control wheel or stick deflects the elevator to cause the airplane to pitch or rotate about its lateral axis, and the function of the rudder, which is controlled by a rudder bar or pedals, manipulated by the pilot's feet, is to control the direction or flight by impressing yawing moments to the machine.

It is obvious that great skill is necessary to steer an airplane about the three axes of rotation with independent controls, and is furthermore clear that no one is as dextrous with his feet as his hands and, therefore, the operation of the plane becomes quite awkward, particularly to beginners. In making a turn, it is necessary that the rudders and ailerons be moved in coordination, although the elevator is usually moved independently, unless the turn is to be made while climbing or diving.

It is well known that direct linkage of the rudder and ailerons with a common control mechanism would be impossible because both the absolute and relative magnitude of the many forces, hereinafter more fully described, and deflections of the rudder and ailerons vary with speed of the airplane, as well as with the variance in magnitude of the propeller slip stream, which usually affects the rudder. These absolute and relative magnitudes of forces also vary as the rate of turn or angle of bank is changed.

As a subsequent analysis will show the forces required to roll an airplane into a turn are quite different from those required to maintain the turn once the angle of bank is established. This is true not only for the absolute magnitude of the forces but is also true for the relative magnitudes of the rudder and aileron forces. In addition to these the aileron forces for the accelerating and steady state conditions are actually in the opposite direction. The above statements are, of course, strictly true only when the turn is established and maintained under ideal conditions without sideslip.

Owing to the practical difficulties of preserving the necessary coordination of the controls it is not the current practice to make turns under the ideal conditions as described above. Instead of this, airplanes are currently designed with a balance between the aerodynamic forces due to dihedral angle, fin area, etc. so that turns may be made as follows. The airplane is rolled into a turn by means of rudder and aileron deflections so coordinated as to prevent any lateral acceleration. When the desired angle of bank (rate of turn) is reached, both the rudder and ailerons are returned to neutral position the reduction in the two controlling forces being coordinated so that no lateral acceleration will exist and so that the angle of bank remains unchanged. This will leave the airplane in such a position that the wing on the inside of the turn will be advanced slightly ahead of the other wing thus resulting in a component of lateral motion towards the center of the turn. This lateral motion (slideslip) acting on the tail produces a yawing force that tends to maintain the turn. The increased speed of the outer wing tends to increase the angle of bank which is opposed by the effect of the sideslip on the dihedral angle. Given a perfect balance of these forces the airplane will continue to turn indefinitely at a constant angle of bank as long as the controls are neutral. In order to restore the airplane to straight and level flight, it is necessary to deflect the rudder and ailerons in a direction opposite to that required in starting the turn. As the airplane rolls out of the turn the controls are again neutralized leaving the airplane in straight and level flight. The operation of the controls must be again coordinated both in application and release so as to prevent lateral acceleration.

This is indeed an awkward and complicated way to make a turn. Student pilots find that a great deal of training and practice is necessary before turns can be made smoothly. They are likewise required to devote so much attention to making turns that hazardous conditions may arise that they might otherwise have foreseen.

Furthermore, the rather precarious balance of aerodynamic forces that permits an airplane to continue a turn, and in some cases with a continually increasing angle of bank, is in itself a hazardous condition. It is obvious why instruments are required when flying blind as neutral position of the controls give no assurance of flying straight and level.

This hazard may be eliminated by increasing the dihedral angle, reducing the fin area or by other means so that the airplane will roll out of a turn with the controls neutral. Pilots are prejudiced against airplanes so designed because the maneuverability appears to be poor due to the fact that controlling effort must be applied continually during a turn. This prejudice does not appear to have too sound a basis but it is so well established that all air planes are designed with this precarious balance of aerodynamic forces.

It is evident that, if the control system assured the establishment and continuance of a turn without lateral motion, an excess of lateral stability would be unnoticed by the pilot. This is the condition prevailing in the control system about to be described. As this system is described it will be obvious that this very desirable condition of excess lateral stability is a necessary adjunct of the system.

With the foregoing facts and problems now well in mind and in order to clearly understand the changes which must be made in control forces to vary the speed and attitude of the plane, it is necessary to set down briefly some of these forces and the way in which their magnitude and effect is determined.

Obviously, when a given speed of a plane is known, as well as the radius of a turn at that speed, the centrifugal acceleration can be determined. With such centrifugal force known, as well as the rate at which such turn is being made and the amount of acceleration due to gravity, the angle at which the plane should be banked can be determined. This angle should be such that the resultant of gravity and the centrifugal force is perpendicular to the lifting surface of the airplane.

It has furthermore been determined that the rate of yaw and the rate of pitch of a plane are both resultants of the rate of turn and of the inclination of the yawing and pitching axes. Manifestly, the lifting force of one wing must be increased as a turn is made, due to the increased velocity of the other wing. Of course, this varies as the angle of bank varies.

During the turn, the outer wing travels at a velocity greater than the inner wing by an amount proportional to the rate of yaw, and therefore, has an excess lift that is dependent upon the speed of the plane, the rate of yaw, and the lifting force of the outer wing. This force which tends to roll the airplane to a steeper banking angle is the first of three principal forces acting on a plane during a turn, and is in direct proportion to the tangent of the angle of bank, but independent of the plane's speed.

The rate of yaw and the speed of the plane being known, the effective angle of the tail surfaces to the air stream may be ascertained, and from the determination of such angle, the force exerted thereby is mathematically obtainable. This force opposes the turn and must be supplied by the rudder. It is in direct proportion to the sine of the angle of bank, but independent of the plane's speed.

A similar force, also dependent upon the speed of the plane and rate of yaw, which opposes the turn, is caused by a component of the excess drag of the outer wing. The sum of these two forces may be called the yawing force, or the second principal force acting on the plane.

While an airplane is rolling, the effective angle of attack of the descending wing exceeds that of the ascending wing in accordance with the angular rate of roll at a given speed of the plane. In other words, the force required by the ailerons to roll the plane is equal to the angular rate of roll times the speed of the plane, and this force is the third of the force factors which effect the turn of a flying airplane.

It should be noted that a force is required to roll the craft, whereas after the roll has ceased and a steady banking angle is to be maintained, a force in the opposite direction is required to prevent the angle of bank from increasing. Therefore, the force required to roll the plane and the force which tends to roll the plane to a steeper banking angle are in opposite directions and require opposite deflections of the ailerons.

In addition to the yawing force mentioned above caused by the greater velocity of the outer wing over the inner wing, there is another greatly effective force. A yawing force is caused by an excess drag in the downwardly deflected aileron over the upwardly deflected aileron. This drag is dependent upon the extent of lift in each aileron or the force required of the aileron to roll the plane less the force which opposes such force and tends to oppose the roll.

Finally, there is a force similar to the last mentioned yawing force due to the increased drag of the outer or faster moving wing. These last two yawing forces combined constitute the fourth of the main airplane turning forces which must be considered in developing the controls forming a part of the instant invention.

Figure 1:
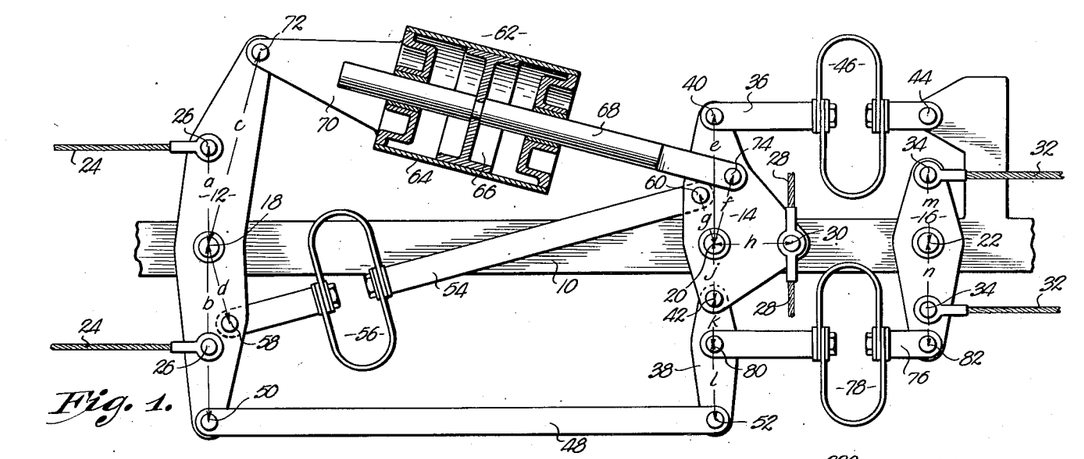
Fig. 1 is a top plan view of an airplane control system made in accordance with my present invention, parts being broken away for clearness, and showing the same attached to a fragmentary portion of the framework of an airplane.
Figure 2:
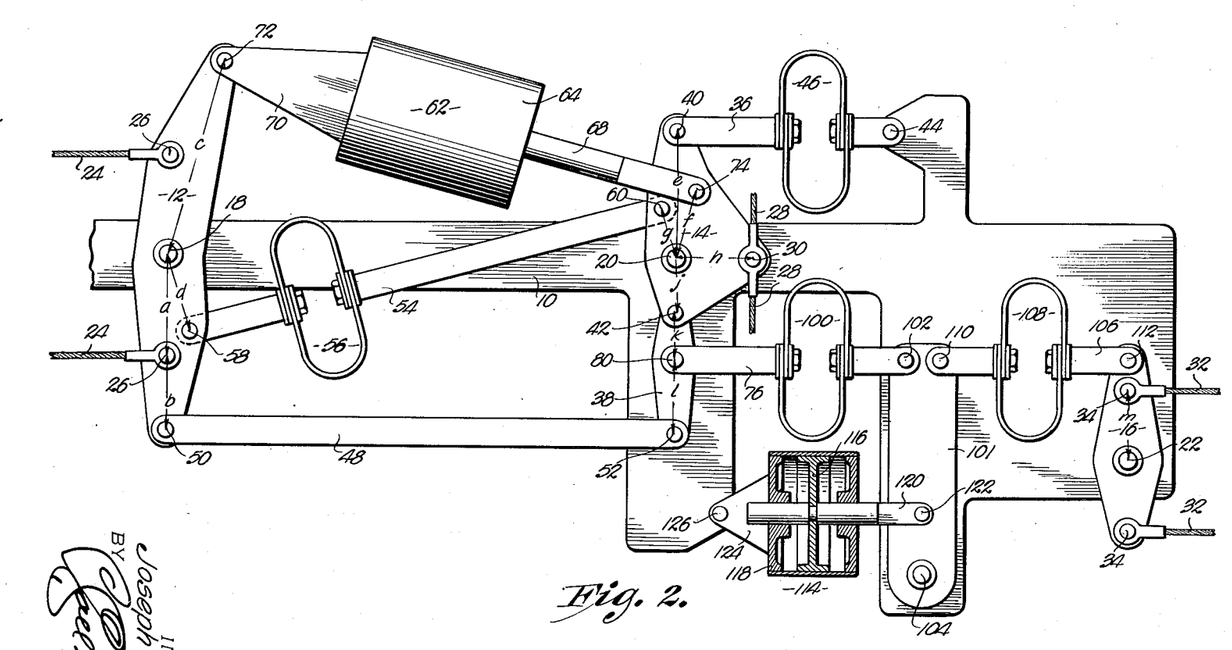
Fig. 2 is a top plan view, similar to that shown in Fig. 1 and showing a modified form of my airplane control system.
Figure 3:
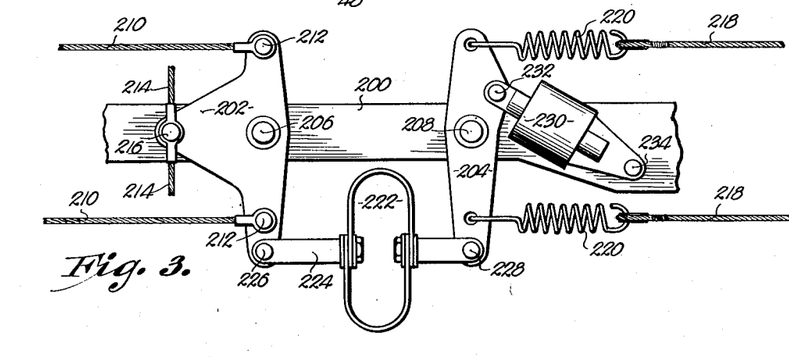
Fig. 3 is a top plan view of another modified form of my invention.

In all of the figures of the drawings, the controls are shown in a neutral position. Referring particularly to Fig. 1 of the drawings, the numeral 10 represents a portion of the frame of an airplane, upon which is swingably mounted a series of yokes. These yokes, including a control yoke 12, an aileron yoke 14, and a rudder yoke 16, are pivotally fulcrumed to frame 10 at points 18, 20 and 22 respectively, intermediate their ends.

A pair of cables 24 pivotally joined to yoke 12 as at 26 terminate in connection with a control wheel or control stick (not shown) in a manner well known in the art. Similarly, a pair of cables 28 extend oppositely from pivot point 30 on yoke 14 for connection with hinged or otherwise pivoted ailerons, usually forming part of the trailing edge of the wings. These ailerons are not shown in the drawings, nor is the airplane rudder which is normally a swingable surface at the rear end of the craft. A pair of cables 32 pivotally secured to yoke 16 as at 34, lead to and operably join the rudder.

The aileron yoke 14 is substantially triangular-shaped, pivot point 30 being near one corner thereof, and one end of links 36 and 38 being pivotally secured as at 40 and 42 respectively near the remaining two corners of yoke 14. The opposite end of link 36 is pivotally attached to frame 10 as at 44, and a spring 46 is interposed within link 36 intermediate its end.

A relatively long link 48 joins control yoke 12 and link 38, being pivotally mounted as at 50 near one end of yoke 12 and as at 52 to the end of link 38 opposite pivot point 42. The yokes 12 and 14 are directly joined by a link 54 having a spring 56 interposed therein. One end of link 54 is pivotally secured as at 58 at a point between fulcrum point 18 and pivot point 50, and the opposite end of link 54 pivotally joins yoke 14 as at 60 at a point between fulcrum 20 and pivot point 40.

A damping or retarding device is shown in Fig. 1 as consisting of a conventional dashpot generally designated by the numeral 62. This dashpot 62 has a cylinder 64, a piston 66 slidably mounted therein, a piston rod 68, secured to piston 66, and a bracket 70 extending from one end of cylinder 64. The free end of bracket 70 is pivotally fixed to one end of control yoke 12 opposite to point 50 as at 72 and the free end of piston rod 68 pivotally joins yoke 14 at a point designated 74 between points 20 and 40 on yoke 14.

The link 38 and the rudder yoke 16 are connected by a link 76 having a spring 78. One end of link 76 is pivotally secured as at 80 intermediate the ends of link 38 and the opposite end of link 76 is mounted pivotally as at 82 to one end of yoke 16.

It should be noted that three of the above described forces are continuously exerted in proportion to the displacement of the control wheel. These are the forces required to maintain the turn after the roll has ceased. Springs 56, 46 and 78 are placed in the control system in order that the angular deflection of the control surface will vary as the desired function of V, where V represents the speed of the plane.

The other two forces exist only by virtue of the rotation of the control wheel and vanish when rotation ceases irrespective of its final position. These forces are the accelerating forces which in addition to the summation of the other three are required to roll the airplane to its final angle of bank.

It should now be evident that the fixed forces need not be closely coordinated in order to make a smooth turn without appreciable lateral acceleration. These fixed forces are not immediately applied but are instead gradually and steadily increased as the wheel is rotated and the airplane is rolled. The gradual spread between the rudder and aileron control forces is compensated by a gradual excess or deficiency of yaw. The resultant component of lateral motion will bring forces into play that will result in equilibrium. It is evident that the crudest sort of approximation of the steady forces will result in considerable less lateral motion than current control systems where these forces are completely lacking. As the accelerating forces are immediately applied, it is important that they be as closely coordinated as is the coordination required of the conventional control system.

The accelerating forces are applied by means of frictional forces that ceased when rotation of the control wheel ceased. This force may be established in many ways and for purposes of illustration, a dashpot 62 has been shown which may have a fluid filled cylinder 64. The viscosity friction of the fluid flowing through an orifice or restricted passage would then supply the necessary force. In spite of the large cylinder dimensions required it is desirable, however, that the fluid be atmospheric air.

It is assumed that both the aerodynamic force exerted by a control surface and the tension on its control cable are proportional to the product of its displacement (if small) and $V^2$. This may not be exactly true but it will not invalidate the compensation methods to be described. It is only necessary that the actual forces and displacements required be substituted in the appropriate equations instead of the theoretical forces and displacements shown.

A control surface may be said to have stiffness like a spring, in that the force required to deflect it is directly proportional to the deflection. This may, by lever arms, be resolved into tension and displacement in the control cable where the stiffness may be defined as the ratio of pounds tension in the cable to inches deflection.

For a constant speed, a control surface would, therefore, act in a control cable exactly as a spring. The deflecting force on a control surface is, however, proportional to the square of the velocity of the airplane, so in this respect, it differs from a spring in the control cable.

As an example of how a spring in a control cable may cause the control surface to vary as a function of the speed, the following explanation is given. Consider the case of a spring of stiffness S moving a control surface having a stiffness $CV^2$ (as measured in the control cable). Now the overall stiffness will be:

$$\frac{CV^2 \times S}{CV^2 + S} = \text{Combined stiffness}$$

and the ratio of control surface displacement to control wheel displacement will be:

$$\frac{S}{CV^2 + S} = \text{Displacement ratio}$$

When two springs are in series, their combined stiffness is less than either. In accordance with Hook's law, they must combine as shown by the above "combined stiffness" formula. For example, if the two stiffnesses are equal, the combined stiffness is one half of either and the displacement will, likewise, be equally divided. The displacement must therefore be as given by the above "displacement ratio" formula.

It is evident that, at the velocity where $CV^2=S$, the displacement will vary inversely as V. It may be seen that, at velocities either higher or lower than this, this ratio will change appreciably but that if two such controls are to be coordinated their relative forces remain unchanged.

Next, the forces which tend to hold the plane in a turn, as above described, should be considered. It may be seen that here the displacement must be inversely proportional to $V^2$. This is obviously impossible and may only be approached by making spring stiffness S very small compared to $CV^2$.

These two forces may be multiplied by a factor $CV^x$ and the other forces similarly multiplied so that the ratio between the forces would be unchanged at any speed. These forces may then be produced by springs 56, 46 and 78. This would mean that the ratio between wheel displacement and angle of bank is no longer independent of speed but that the angle of bank would increase somewhat with speed.

There is another consideration that has heretofore been ignored and that is the effect of the propeller slip stream. In conventional airplanes this has a pronounced effect on the rudder but none on the ailerons. It is desirable that coordination be unaffected by the existence or absence of the slip stream. The flow of this slip stream along the fuselage and tail surfaces requires, for a fixed rate of yaw at a fixed speed, a greater force be developed by the rudder than is required when the slip stream is absent. The spring 78 should therefore be chosen to just permit this additional force. This determines the factor $CV^x$ by which all of the forces should be multiplied to give perfect coordination but with the angle of bank increasing as the speed increases.

This determination may be made by flying the airplane with conventional controls at a fixed speed near the limit of the desired speed range. It should be placed in a steady banked turn and held constant at a carefully observed angle of about 45°. The rudder tension and displacement with and without slip stream should be noted as should the aileron tension and displacement which will not vary with slip stream. The speed and bank must be kept constant and no lateral motions permitted. Similar tensions and displacements should also be measured at the same angle of bank at a speed near the other limit of the speed range.

From the data obtained the stiffness of spring 78 may be calculated so as to give the desired increase in yawing force in the presence of slip stream. This value will be slightly different for two speeds so the average must be used. This will determine the value of the exponent in the factor $CV^x$. The value of $x$ will probably be approximately ½. The rate at which the angle of bank must increase with speed is thus determined and the proper deflection of the aileron controls may then be determined.

In addition to the aerodynamic forces set forth above there are accelerating forces required because of the moment of inertia of the airplane about its rolling and yawing axis.

The rate of yaw is proportional to sin B divided by V and the acceleration in yaw is of course the differential of this or is proportional as follows, where B is the angle of bank radians:

$$YM = R/V \,(\cos B)$$

where R is the angular velocity of the roll and YM is the accelerating yawing force. YM times the moment is of course, the rudder force (RM) required. This force is continuous throughout the rolling period.

Now the rolling acceleration and force RM have the following proportions:

$$RM = dR$$

where $dR$ is the rate of change of the angular velocity of roll.

Now RM is zero during the roll while the rate of roll is uniform. It is in the direction opposing RF, the force required to maintain the plane in a roll, when the roll is being started and in the same direction as RF when the roll is checked upon reaching the desired angle of bank.

Now note that the force YM varies inversely as V or that the required rudder displacement varies inversely as $V^3$. It is evident that no spring in the control cable will produce such a variation. It is, however, evident that this acceleration is always accompanied by the acceleration RF produced by the ailerons. Now this force is directly proportional to V and the required aileron displacement is inversely proportional to V. This force YM should therefore not be derived directly from the control wheel and be attenuated by one spring only, but should be derived from the actual displacement of the ailerons and thence through the spring 78 proved for the YF force, where YF represents the combined force opposing the turn and the force caused by excess drag of the outer wing. Now if all the forces are multiplied by the slip stream factor $CV^x$ suitable springs may be selected for transmission of the YF and RF forces so that these forces are approximately correct. Then YM will vary with speed approximately as desired.

There are two other accelerating yawing forces in addition to the YM force mentioned above. The first of these is caused by the excess drag of the downwardly deflected aileron which opposes the required yaw and is effective immediately upon deflection of the control, before the moment of inertia permits the roll to start. The second force is of similar nature, caused by the excess drag of the descending wing. This aids the required yaw, but is only effective after the moment of inertia is overcome and the roll starts, whereupon it increases until the maximum rolling velocity is reached. It decreases again as the rate of roll is checked upon approaching the ultimate angle of bank.

Both of these forces vary with speed in the same manner. They are primarily related to the angle of attack and the lift drag ratio of the wing which is directly related to the speed itself. These forces are inversely proportional to $V^n$. For the average wing, $n$ will be approximately 1.3 from the stalling speed to a speed about 70% greater, where the lift to drag ratio is maximum. At higher speeds the value of $n$ drops abruptly.

A close approximation may be secured by providing these forces inversely proportional to the speed and combining them with YM.

It is obvious that as the ailerons are deflected immediate deflection of the rudder should be obtained only sufficient to overcome the yawing force produced by the excess drag of the downwardly deflected aileron. After the moment of inertia is overcome and the roll starts, additional yawing force should be provided to accelerate the mass moments about the vertical axis. The excess drag of the inner or descending wing may in some airplanes be sufficient to accomplish this. If this be the case, the arrangement shown in Fig. 1 will serve, otherwise, the arrangement shown by Fig. 2 may be used.

Referring again more specifically to Fig. 1, the various distances between certain pivot points shall be designated by letters as follows and for clearness, these distances shall be called lever arms:

$a$—distances between point 18 and points 26.
$b$—distance between point 18 and point 50.
$c$—distance between point 72 and point 18.
$d$—distance between point 18 and point 58.
$e$—distance between point 20 and point 40.
$f$—distance between point 20 and point 74.
$g$—distance between point 20 and point 60.
$h$—distance between point 20 and point 30.
$j$—distance between point 20 and point 42.
$k$—distance between point 42 and point 80.
$l$—distance between point 80 and point 52.
$m$—distances between point 22 and point 34.
$n$—distance between point 22 and point 82.

A fixed displacement of the control wheel is transmitted to the ailerons and rudder respectively through the springs 46, 56, and 78. This displacement will vary with the speed of the airplane as previously described by selection of springs of suitable stiffnesses. Accelerating motions to the rudder and a portion of the continuous motions are derived directly from aileron displacement by means of the lever arm $j$.

A leak is provided around or thru the piston 66, in such a manner that the pressure exerted on the piston 66 (or cylinder 64) and thence to the aileron yoke 14 is directly proportional to the rate of motion of the cylinder 64 (or piston 66). This requires that the viscosity of the fluid must be constant with pressure and temperature. This would probably rule out the use of any known liquid because of their large change in viscosity with change in temperature. Atmospheric air or any other gas would appear to be satisfactory as their viscosity changes not at all with pressure and but little with temperature.

The lever arms $a$, $h$, and $m$ are arbitrarily chosen so that reasonable deflections of their respective yokes will prevail with maximum deflection of the control wheel, ailerons, and rudder. Lever arms $n$, $l$, $k$, $f$, $e$, and $g$ may likewise be arbitrarily chosen. The length of the lever arms $d$, $b$, and $j$ appear in formulae to follow. The other lever arm lengths appearing in the formulae are those arbitrarily chosen.

Lever arms $c$ and $f$ may be within limits arbitrarily chosen giving consideration to the following factors. It is obvious that the initial displacement of the aileron yoke can not be proportional to the rate of motion of the control yoke as it must move an amount in excess of the initial aileron yoke displacement in order that any force be developed. If air is used in the accelerating cylinder a small amount of additional displacement will also be required in order to develop the necessary air pressure in the cylinder. Thus, rather than an abrupt deflection of the control surfaces, as the control wheel is beginning its rotation, we will have a steadily increasing deflection over a short period of time and thereafter as rotation is continued a steady deflection proportional to the rate of rotation. This effect is not undesirable if held to a small amount. In order that this effect be kept small, it is necessary that $c$ be large compared with $f$. The larger this ratio becomes the greater will be the force required to rotate the control wheel. It may be necessary to limit this ratio to prevent excessive control effort.

If air be used, cylinder 64 must be of as large a diameter as practical in order to obtain maximum pressure with minimum displacement. It is obvious that the length of the cylinder should be great enough to accommodate a piston stroke equal to the maximum deflection conditions. This length should not be excessive as this would require greater displacement to develop a given pressure. Now a leak should be provided around or through the piston 66 so proportioned that the fluid flowing through it will, by its viscosity, provide a frictional force of just the right magnitude to give the required deflections.

Flight checks will, of course, disclose any unbalance or lack of coordination in the controls which may be corrected by changing the magnitude of appropriate lever arms and spring stiffnesses as required.

At first thought it would appear that, if the spring stiffnesses were in proper balance with control surface stiffnesses at sea level, balance would be lost at high altitudes where the low air density would result in lessened control surface stiffness. Such is not the case, balance merely occurs at speeds greater by a factor inversely proportional to the square root of the density ratio. The stalling speed increases by the same factor so this results in no disadvantage. The forces required will, however, decrease by the same factor so that as a result the angle of bank to be expected from a given control wheel displacement will be increased by the same factor.

Now we have seen that the angle of bank increases with speed at constant altitude by a factor proportional to $V^x$ where $x$ is the slip stream factor previously explained. This new factor influencing the angle of bank is accompanied by a velocity change that does not in itself produce a change in angle of bank so that a general relationship may be expressed, as follows:

$$B = \frac{CWV^x}{D^{\frac{1-x}{2}}}$$

where $B$ = angle of bank, $C$ is a constant, $W$ is control wheel deflection, $V$ is speed of the plane, $D$ is density of the air and $x$ is the slip stream factor.

The value of the slip stream exponent $x$, stiffnesses of various springs, and length of the critical lever arms may be determined by the formulae to follow.

In the following equations two speeds are selected at which the coordination is to be exact. At other speeds the coordination will be closely approximated.

For example, assume that the desired speed range is 50 and 150 miles per hour. Now it will be evident that $(50 \times 150)^{1/2}$ or 87 miles per hour is the mid speed at which the rate of departure from coordination will be zero but at which the actual departure should be adjusted to be a maximum. The maximum departure in the other direction should occur at the limits of the speed range namely 50 and 150. The two speeds for perfect coordination should, therefore, be selected near the limits of the speed range. In this case 60 and 125 miles per hour would be suitable speeds. These would be the speeds V1 and V2 which are used.

The first step is the determination of $x$ from flight test data which for any one speed and steady rate of turn should give us rudder displacement $r$ and tension $t$ without slip stream and similar values $rl$ and $tl$ with slip stream. Now the force or tension in each case is the product of stiffness and displacement, while the speed $V$ of the air at the rudder is proportional to the square root of the stiffness. Therefore:

$t/r$ = stiffness without slip stream $tl/rl$ = stiffness with slip stream $\dfrac{tlr}{trl}$ = ratio of relative speeds squared $tl/t$ = force ratio required = $\dfrac{tlr^{\frac{x}{2}}}{trl}$ Solve for $x$ and use to determine the values of V, F, $a$ and D.

$T = \dfrac{d}{h}$ Aileron force exerted at control $L = \dfrac{lj}{(k+l)h}$ Rudder force exerted at ailerons $N = \dfrac{b}{k}$ Rudder force exerted at control At speed V1 as determined by flight tests
$\begin{cases} K = \dfrac{n}{m} \dfrac{\text{Rudder deflection}}{\text{Aileron deflection}} \text{ Accelerating force} \\ C = \dfrac{n}{m} \dfrac{\text{Rudder deflection}}{\text{Aileron deflection}} \text{ Fixed force} \\ R = m/n \times \text{rudder stiffness} \\ A = \text{Aileron stiffness} \end{cases}$ $(V2/V1)^x = F$ control force increase with speed
$(V2/V1)^2 = V$ control stiffness increase with speed
$(V2/V1)^{x-1} = a$ aileron (displacement change with speed (accelerating only)
$(V2/V1)^{x-2} = D$ fixed displacement changes with speed Now at speeds V1 and V2 the forces exerted at the rudder may be equated as follows where S=stiffness:

$$\frac{S78R+F}{S78+R} = \frac{S78RV}{(S78+RV)}$$

$$S78 = \frac{RV(F-l)}{(V-F)}$$

Now the total displacement of rudder and spring as related to rudder alone is:

$$l + R/S78$$

Therefore:

$$L = k(l + R/S78)$$

This determines the lever arm $j$.

Now the fixed aileron displacement is related to the rudder displacement by the factor $1/C$ and tends to move the rudder in the negative direction by factor $k$ so:

$$N = l - kL/C$$

This determines lever arm $b$.

Now it is desired that a uniform accelerating force applied by the cylinder 64 give aileron and rudder displacements varying with the proper function of V.

We must, therefore, equate the displacement forces at the two speeds, as follows:

$(S56+S46)g/h + A + kR =$
$$(S56+S46)ag/h + (A+kR)Va$$

$$S56 + S46 = \frac{h(Va-1)}{g(1-a)}(A+kR)$$

When the fixed forces are applied by the control yoke the force exerted by the rudder on the ailerons is proportional to the factor L and the required aileron displacement is related to the rudder displacement by the factor $1/C$. If we therefore show the force balances at the two speeds we have:

$(A - LCR) = (S56+S46)(T-1)g/h$
$F(A - LCR) = (S56+S46)(T-D)g/h$ or $$T = 2 - D/F$$

which gives us the lever arm $d$ and $$S56 = (S56+S46)\frac{F-D}{F(T-1)}$$

which gives us both S56 and S46.

Referring now particularly to Fig. 2, it will be noted that this Fig. 2 is identical to Fig. 1 except for certain linkage, springs, etc. extending rearwardly from link 76. Therefore, the reference numerals have been carried from Fig. 1 to Fig. 2 where the parts are the same and new numerals added to Fig. 2 as different parts are hereinafter described.

In Fig. 2, link 76 has a spring 100 and one end thereof opposite to pivot point 80 is pivotally secured to a bar 101 as at 102, which bar 101 is pivotably mounted on frame 10 as at 104. This bar 101 is joined to yoke 16 by a link 106 having a spring 108 interposed therein and link 106 is pivotably secured to bar 101 and yoke 16 as at 110 and 112 respectively.

No provision has heretofore been made to compensate for the RM force. In the case of relative high speed airplanes having a low moment of inertia about the longitudinal axis this force may be small compared to RF so its compensation may not be important. In cases where compensation is desired, the following means may be used to accomplish this result. It should be noted that the method about to be described employs an air cylinder 114 (similar to the accelerating cylinder) with the rudder spring 100. The use of such a cylinder 114 should effectively dampen any rudder flutter oscillations that might otherwise be encouraged by connection of the rudder through a low stiffness spring such as 78.

Air cylinder of dashpot 114 is similar to dashpot 62. A piston 116 is slideable in a cylinder 118 and a piston rod 120 joined to cylinder 118 is pivotably mounted at its free end to bar 101 as at 122. A bracket 124 on cylinder 118 is pivotally secured to frame 10 as at 126.

This force RM is an inertia force that opposes RF at the start of the roll. When the roll is established at a uniform rate, it vanishes. As the roll is checked upon approaching the ultimate angle of bank, the force again reappears in the opposite direction and tends to cause the roll to continue.

If the aileron control force RF could be made large at the beginning of the roll, then decreased to a lower but uniform magnitude during the roll and, at the point where the roll must be checked, decrease it again or even reverse it, the desired forces could be realized. Such an arrangement would be difficult to accomplish. Furthermore, this would probably cause an uncomfortable jerk at both the beginning and completion of the roll whereas, the moment of inertia force tends to furnish a smooth and uniform acceleration at these times.

If no compensation is made for this force skidding will result at the beginning and slipping at the end of the roll. This may be prevented by retarding for a short time the application of the rudder force at the beginning of the roll and maintaining it for a short time at the completion of the roll, after the aileron forces causing the roll have been removed. It is obvious that the cumulative effect of all forces remain unchanged as what force is lost at the beginning of the roll because of RM is added at the end of the roll, while the delay in applying rudder force is balanced by the delay in removing it. This desirable compensation may be accomplished in the following manner.

Consider first that the moment of inertia force RM is independent of V whereas the force RF is directly proportional to V. The retardation force applied to the rudder control should therefore decrease with V in the same manner.

The dashpot 114 should be introduced at a point where the rate of travel is inversely proportional to V so that the retardation will be equivalent to that of RM on the roll.

The new compensation shown in Fig. 2 does not affect the remaining elements of Fig. 2, described when referring to Fig. 1 above. The springs 100 and 108 combined are exactly equal in stiffness to the spring 78 in Fig. 1, that is:

$$S78 = \frac{S100 \times S108}{S100 + S108}$$

The stiffness of spring 100 and spring 108 must be so proportioned that, at their junction, the rate of motion should depart from the rate of motion applied by a factor inversely proportional to V.

If we assume that the rudder has a stiffness equal to $RV^2$ and equate the displacements at the two speeds V1 and V2, the following equation results:

$$\left(S100+\frac{S108RV1^2}{S108+RV1^2}\right)^{V2} = \left(S100+\frac{S108RV2^2}{S108+RV2^2}\right)^{V1}$$

Using this equation and the one above for Sr solve for spring 100 and spring 108. It is now required only to provide a leak in the retarding air cylinder such that the friction bears the same relationship to the combined stiffnesses of spring 100, spring 108 and the rudder as RM does to RF. The proportion between spring 100 and spring 108 as arrived at above assures that if this relationship is correct for one value of V it will be for all.

The combined stiffness, which can be designated Sm, has the following value:

$$Sm = S100 + \frac{S108RV^2}{S108+RV^2}$$

If we designate the frictional resistance of the damping cylinder as Fm then the following relationship is required:

$$\frac{Sm}{Fm} = \frac{RM}{RF}$$

It is evident that after the ailerons have been deflected but before the roll has started, a yawing effect will be produced due to the differential drag of the ailerons. (RF component of YA force). Therefore, a portion of the accelerating rudder force should be applied without delay.

It is obvious that if the retardation cylinder contains air, instead of an incompressable fluid, that an immediate rudder displacement is possible regardless of the viscosity friction of the leak. The proportional magnitude of this initial displacement may be adjusted as desired by variation in the area of the piston or length of cylinder and thus changing the stiffness of the air so that it may be any desired ratio to the combined stiffnesses of spring 100, spring 108 and rudder. It is evident that the desired ratio can not be maintained exactly at all altitudes if we assume that the density of the air inside the retardation cylinder closely follows the density of the outside atmosphere.

Account has been taken of the effect of the propeller slip stream on the rudder when making a turn and a method for compensating for this effect described. The effect of the propeller torque on the trim about the longitudinal axis and of the swirling propeller slip stream on the trim about the vertical axis must likewise be compensated.

In any airplane, the torque exerted by the engine on the propeller is balanced by a torque tending to roll the plane about its longitudinal axis. The propeller slip stream is rotating in the same direction as the propeller so, if the vertical tail surfaces are not symmetrically placed on the axis of this swirling slip stream a yawing moment results. The fin and rudder are usually above this axis so, with a clockwise rotating propeller, the airplane will tend to turn left.

It is the common practice to twist the wings slightly so that the wing having the greater angle of incidence will produce a greater lift. This excess lift on one side is adjusted to just balance the torque. The vertical fin is then adjusted to a slight angle so that, at the same speed and power, the yawing effect of the slip stream is exactly balanced.

These forces will not remain balanced at other speeds and powers, however, so the pilot is then required to provide the necessary forces by means of independent deflections of rudder and ailerons in order to maintain straight and level flight.

When using the control system just described, it is, of course, possible to obtain perfect trim at one power and speed by means of the twisted wing and offset fin. It will not, however, usually be possible to maintain perfect trim at other speeds and powers by merely moving the control wheel. This is because the rudder and ailerons are moved in coordination and not independently as in the conventional control system. In order to obtain the necessary balance the vertical tail surfaces must be placed below the axis of the swirling slip stream. This is frequently impractical so the following method may be used to obtain the desired trim at all speeds and powers.

As is the common practice, twist the wings so that the propeller torque is balanced at cruising speed and power, with the control wheel in neutral position. Now with the airplane gliding and the engine idling with no propeller torque, the control wheel must be moved slightly to balance the torque of the twisted wing. The unavoidable deflection of the rudder will produce a yawing moment tending to turn the airplane. This may be balanced by setting the fin at a slight angle so perfect trim will be obtained in this gliding condition.

Now at cruising power and speed with the control wheel in neutral position, the trim about the longitudinal axis will remain perfect. However, the combined effect of the offset fin and the propeller slip stream will produce a yawing moment tending to turn the airplane. This may be balanced by inclining the propeller thrust axis to one side instead of along the longitudinal axis. The thrust of the propeller can then produce a turning moment equal and opposite to the turning moment it is desired to eliminate.

If perfect trim may be secured under two flight conditions as described above, it should be possible to maintain the trim very closely for all flight conditions by suitable small deflections of the control wheel.

Several of the methods just described may be used to devise a control system of more conventional type, in which the proper accelerating forces are provided but, like conventional systems makes no provisions for the continuous forces.

Such a system is illustrated in Fig. 3. A frame 200 carries a pair of swingable yokes 202 and 204, fulcrumed as at 206 and 208 respectively. Cables 210, pivotally secured to yoke 202, as at 212, connect to the control wheel or stick (not shown). Cables 214 lead to and join the ailerons and are pivoted on yoke 202 as at 216, and cables 218 terminate in connection with the rudder, which rudder and the ailerons also are not shown in the drawings.

A pair of springs 220 are interposed between cables 218 and yoke 204, and a spring 222 is interposed between yokes 202 and 204 by a link 224 pivotally secured thereto as at 226 and 228 respectively. A dashpot 230 is of the same character and joins yoke 204 and frame 200 as at 232 and 234 in the same manner as described above with respect to dashpots 62 and 114.

The total stiffnesses of springs 220 and 222 is exactly equivalent to that of springs 100 and 108, shown in Fig. 2 and their constants are arrived at in the same manner. The springs 220 are shown as two coiled springs, and one yoke is eliminated, merely to illustrate one of the number of variations of the mechanical construction employing the principles shown in Fig. 2.

In this system a deflection or rotation (not the rate of rotation) of the control wheel deflects both the ailerons and rudder to give suitable accelerating forces to roll the airplane into a turn. After the angle of bank has been established restoration of the control wheel to neutral position (or nearly so, depending on the relative balance of aerodynamic forces) permits the turn to continue at a steady rate. Straight and level flight is resumed by deflection of the wheel in the opposite direction and then back to neutral as level flight is reached.

It is evident that the excess of lateral stability is no longer required, as by this method the conventional balance of forces required to maintain the turn are exactly the same as in conventional aircraft.

Note that the relative decrease in rudder deflection with increasing speeds is produced by the attenuation of the springs 220 and 222. Likewise, the delay in roll caused by the moment of inertia about the longitudinal axis is compensated by the delay in yaw introduced by the retardation cylinder 230.

The cumulative effect of the fixed forces, that were provided in the system previously described, are now lacking. This results in a cumulative deficiency of yaw which will leave the airplane in a position for maintaining the turn.

It is evident that the retardation cylinder could be omitted and partial coordination of forces still be retained. The use of the spring alone would permit lateral acceleration at both the beginning and end of the roll. If the spring were also omitted rudder and aileron forces could be balanced at only one speed, at other speeds lateral accelerations would be excessive.

Trim for straight and level flight under all flight conditions may be accomplished in exactly the same way as for the system previously described. It should be noted that a fixed deflection of the control wheel deflects the ailerons in a direction opposite that obtained by a fixed deflection of the wheel for the other system described. With the vertical tail surfaces above the slip stream axis, it may be possible to achieve trim with little or no lateral deflection of the thrust axis.

It is apparent from the foregoing that applicant has provided a system of airplane control that, from the standpoint of the pilot, operates much like an automobile. In other words, it is well known by those skilled in the art that the conventional airplane is brought into a turn by two distinct movements on the part of the pilot, namely, that of deflecting the rudder and that of changing the position of the ailerons. The pilot must coordinate his movements in accordance with the forward speed of the airplane in order to avoid slippage and skidding.

The system above described is capable of initially bringing the airplane into a turn by the mere exertion of revolving movement to a rotatable "steering wheel." The various linkage yieldable and resilient means within this system permits such coordinated movements of the rudder and of the ailerons automatically, irrespective of the forward speed of the airplane.

It is further well known in this field, that the pilot of a conventional airplane, after he has brought the same into a turn, must return the plane's manual controls to the neutral position. Otherwise, the plane will continue to roll even to an inverted position. After the pilot of a conventional plane returns such controls to a neutral position, the plane will remain substantially in the turning attitude. Through use of the system of this invention, the pilot need not return the controls to a neutral position but, on the contrary, holds the same in the new position for turning until it is desired to return the plane to straight and level flight conditions.

Furthermore, through use of the yieldable linkage, not only the resilient springs but the damping device, the pilot operating a plane having this system as a part thereof is assured that the plane will maintain its new turning attitude while the manual controls are in the new position and without returning the same to neutral.

In order to accomplish the above-mentioned purposes, there must be absolute coordination of all auxiliary surfaces of the plane, and the strength of the springs must be so proportioned so as to operate in accordance with the speed forward of the plane, all of which is automatic and not determinative of the skill of the pilot.

Having thus described the invention, what is claimed as new and desired to be secured by Letters Patent is:

1. In an airplane operating system, a movable control member, a movable aileron actuating device, and a movable rudder actuating element; structure pivotally interconnecting said control member, said aileron device and said rudder element, and apparatus pivotally interconnecting said control member and said aileron device, said apparatus including a dash-pot for rendering movement of said aileron device and said rudder element responsive to the rate of movement of said control member; spring means forming a part of said structure and disposed to absorb rudder stiffness as the control member is moved; and means including resilient means pivotally interconnecting said control member and said aileron device, disposed to yieldably oppose movement of said control member and the aileron device by the control member through said apparatus as the control member is moved, the stiffnesses of said spring means and said resilient means being proportioned relatively to provide a ratio of rudder displacement to aileron displacement capable of increasing and decreasing as airplane speed or propeller slip stream decrease and increase respectively to the extent necessary to provide co-ordinated yawing and rolling forces for execution of a turn in an airplane having the system as a part thereof.

2. In an airplane operating system as set forth in claim 1 wherein said stiffnesses of the spring means and the resilient means are relatively proportioned to hold said airplane in a turn with negligible lateral motion and at an angle of bank approximately proportional to the displacement of the control member.

3. In an airplane operating system as set forth in claim 1, wherein said spring means and said resilient means are disposed relative to each other and the apparatus and structure are so arranged as to transmit a force through said dash-pot upon movement of the control member proportional to the rate of motion of the control member whereby to produce accelerating yawing and banking forces of such magnitude as to produce a change in angle of bank and radius of turn in the airplane conforming to a new position of the control member after movement thereof.

4. In an airplane operating system as set forth in claim 1 wherein is provided a frame, a second dash-pot pivotally mounted at one end thereof to the frame and pivotally secured to said structure at its opposite end, said second dash-pot being disposed to retard displacement of the rudder element upon movement of the control member whereby to retard yawing acceleration to the same extent that rolling acceleration is retarded by the moment of inertia of said airplane about its longitudinal axis.

JOSEPH G. SPEER.

REFERENCES CITED

The following references are of record in the file of this patent:

UNITED STATES PATENTS

| Number | Name | Date |
|---|---|---|
| 2,318,833 | Stambach | May 11, 1943 |
| 2,340,237 | Upson | Jan. 25, 1944 |

FOREIGN PATENTS

| Number | Country | Date |
|---|---|---|
| 323,881 | Germany | Aug. 11, 1920 |